Nov. 16, 1926.　　　　　　　　　　　　　　　　1,607,434
G. O. CARLSON
ANTISKID MECHANISM
Filed April 20, 1925
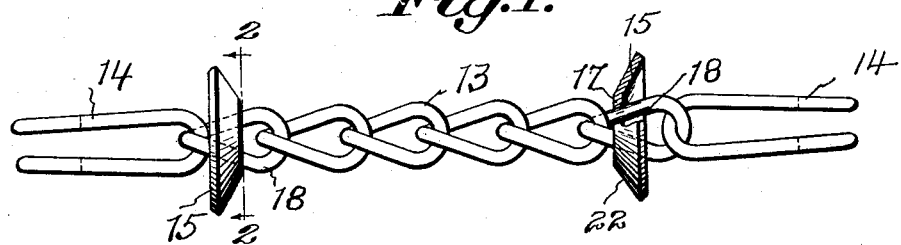
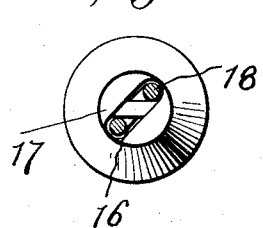　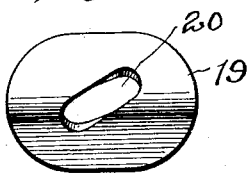　
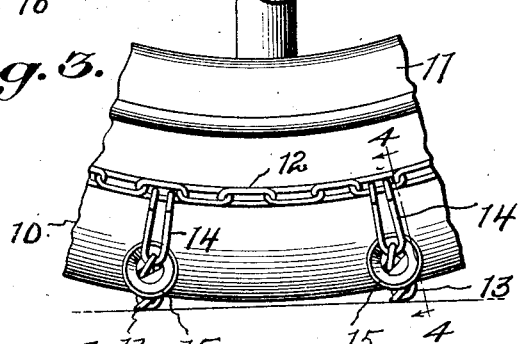
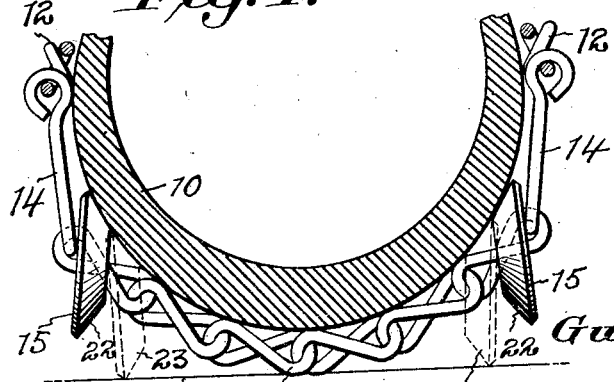
Inventor
Gustave O. Carlson,
WITNESS:-
By
Attorney Patented Nov. 16, 1926.

1,607,434

UNITED STATES PATENT OFFICE.

GUSTAVE O. CARLSON, OF WETHERSFIELD, CONNECTICUT, ASSIGNOR OF ONE-THIRD TO CARL O. HEDSTROM, OF PORTLAND, CONNECTICUT, AND ONE-THIRD TO HENRY HANSON, OF MIDDLETOWN, CONNECTICUT.

ANTISKID MECHANISM.

Application filed April 20, 1925. Serial No. 24,614.

This invention relates to a new and improved anti-skid mechanism, more particularly for application to the cross chains of a tire chain of conventional form, used with motor vehicle wheels or the like.

Among the aims and objects of the invention may be recited the provision of a device of the character mentioned which is simple in structure, can be produced at the minimum cost, applied to a cross chain of the conventional type and will be most efficient in operation.

In the drawings:—

Figure 1 is a plan view of one of the cross chains with my improved anti-skid mechanism associated therewith;

Figure 2 is a sectional end view thereof with the parts in section, being taken generally upon line 2—2 of Figue 1;

Figure 3 is a fragmentary side elevation of a portion of a wheel with a tire chain and my improved anti-skid mechanism connected therewith;

Figure 4 is an enlarged end elevation of my improved mechanism and cross chain and a fragmentary cross sectional view of a portion of a wheel tire, the parts in section being taken generally upon line 4—4 of Figure 3.

Figures 5 and 6 are elevations of one of several modified forms in which my mechanism may be produced.

In the drawings, wherein like characters of reference indicate corresponding parts in the several figures; 10 designates a fragmentary portion of a rubber tire that is shown herein as mounted on the rim 11. The side chains are designated 12 and these are joined by the usual cross chains 13, which are connected therewith through the hooks 14.

All of the above described mechanism is old in the art and constitutes no part of the present invention.

This type of cross chain does not provide an effective means to prevent the car from skidding, or limiting its lateral travel if it should begin to skid, due in a large measure to the fact that such movement is parallel with the length of the cross chain.

Means have been heretofore devised to prevent this lateral movement but all are of such design and structure as to be not only costly to manufacture but limited in use to a cross chain of special form or type and not capable of use with a cross chain of conventional form, and in these and other ways have been found objectionable.

These and other objections in this type of mechanism I have overcome in the device herein shown and described, which consists essentially of a cup shaped disk 15, having a slot 16 through the bottom portion 17 thereof which is shaped so as to permit a link 18 to pass thereto and be held against rotation thereon. These disks are readily assembled with the chain by projecting each of the end links therethrough before assembling the hooks 14 therewith, substantially as shown in Figure 1.

In Figures 5 and 6 I have shown a modified form of disk 19 which is constructed with two portions that are bent at an angle to each other and having a slot 20 therethrough of substantially the same size and shape as the slot 16 above described.

Other forms may be substituted for the disk 15 as may be desired and as adapted for different types of wheels and gripping conditions.

In Figure 4 the cross chain 13 is illustrated in its substantially correct relative position upon the tire 10 and engaging the surface 21 upon which the wheel is rotating. Should the wheel skid or slide laterally, the tire will have a tendency to slide on the cross chain and be brought up abruptly against the angular wall 22 of the disk 15, which will thereby press the disk downwardly until it assumes the position substantially as shown by the broken lines 23 in Figure 4. At this time the sharp peripheral edge of the disk will bite into the surface and prevent further skidding or lateral movement.

As the disk 14 is free to move on the link with which it is associated, it will rock relatively thereto when engaged by the tire, and thus throw the under edge thereof inwardly, which will thereby increase its retarding action on the traveled surface.

When the wheel is rotating about its axis and traveling forward parallel thereto, the disks 15 are out of contact with the surface 21 and only become active and effective when the tire, by reason of lateral movement, rides against a face thereof and projects the same downwardly, as above described.

These disks, or modified forms thereof, are economical to make, may be sold at a very low price and are readily applied to any form of cross chain.

What I claim as new and desire to secure by Letters Patent, is:—

1. In combination with a cross chain; an anti-skid mechanism, having one inclined face, which surrounds both bars of the link with which it is associated, and having an endwise movement thereon.

2. In combination with a cross chain made up of a plurality of links; an anti-skid mechanism, comprising a plurality of separate members, each of which is movably mounted upon a different link near opposite ends of the chain, these members having one flaring face that contacts with the side face of the tire during lateral movement thereof, and by reason of such pressure thereagainst projects the same downwardly into the surface upon which the tire is rotating.

3. In combination with a cross chain; an anti-skid mechanism, comprising members, each of which is mounted upon a link of the chain adjacent to the opposite ends thereof, and when assembled with the tire is upon opposite sides thereof in engagement with the side face of the tire and acquiring a limited endwise movement upon the link between its hinged connection with other links, by a lateral movement of the tire.

4. In combination with a cross chain, an anti-skid mechanism, comprising a cup shaped member having a slot through the bottom thereof substantially the same size and shape in cross section as the link with which it is associated.

5. In combination with a tire; of an anti-skid mechanism connected therewith, comprising in part a plurality of chains that extend across the periphery of the tire and each chain having mounted thereon two substantially similar members that are free to move upon a link of the chain, one member being upon each side of the tire, these members having a peripheral gripping edge and a face at an angle thereto which is in contact with the tire and to which pressure is applied by the side face of the tire during lateral movement thereof, whereby the gripping edge is caused to engage the surface upon which the tire is moving during such lateral movement only.

6. An anti-skid mechanism for a tire chain, comprising companion disks, each of which has an angular face and located upon a link upon opposite sides of the tire, and adapted to move lengthwise on the link of the chain with which it is associated, and rock upon its axis relatively thereto, the position of the disks being such that the tire may slide a limited distance upon the chain therebetween and the engagement of the tire with the angular face of the disk will press the latter downwardly and the peripheral edge thereof into the surface upon which the tire is rotating and prevent skidding or lateral movement of the tire.

In testimony whereof, I have hereunto affixed my signature.

GUSTAVE O. CARLSON.